(12) United States Patent
Fujiwara et al.

(10) Patent No.: US 8,782,763 B2
(45) Date of Patent: Jul. 15, 2014

(54) AUTHENTICATION SYSTEM, AUTHENTICATION METHOD, AUTHENTICATION DEVICE, INFORMATION TERMINAL, PROGRAM AND INFORMATION RECORDING MEDIUM

(75) Inventors: Yusuke Fujiwara, Shinagawa-ku (JP); Yasuko Furuta, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/876,061

(22) PCT Filed: Dec. 27, 2010

(86) PCT No.: PCT/JP2010/073624
§ 371 (c)(1),
(2), (4) Date: Mar. 26, 2013

(87) PCT Pub. No.: WO2012/042682
PCT Pub. Date: Apr. 5, 2012

(65) Prior Publication Data
US 2013/0179958 A1    Jul. 11, 2013

(30) Foreign Application Priority Data
Sep. 28, 2010   (JP) .................................. 2010-216437

(51) Int. Cl.
*G06F 7/04* (2006.01)
(52) U.S. Cl.
USPC ............................................................ 726/7
(58) Field of Classification Search
USPC ...................... 726/4–7, 16–19, 23
See application file for complete search history.

(56) References Cited

U.S. PATENT DOCUMENTS

| 2007/0192849 A1 | 8/2007 | Golle et al. |
| 2007/0226516 A1 | 9/2007 | Kubota et al. |
| 2008/0127302 A1 | 5/2008 | Qvarfordt et al. |
| 2009/0083847 A1 | 3/2009 | Fadell et al. |
| 2009/0249476 A1 | 10/2009 | Seacat |
| 2009/0325661 A1 | 12/2009 | Gross |

(Continued)

FOREIGN PATENT DOCUMENTS

| JP | 2008-52727 A | 3/2008 |
| WO | 2005/122468 A1 | 12/2005 |
| WO | 2009/042392 A2 | 4/2009 |
| WO | 2009/063761 A1 | 5/2009 |

OTHER PUBLICATIONS

International Preliminary Report on Patentability with Written Opinion dated Aug. 2, 2011, issued in International Application No. PCT/JP2010/073624.

(Continued)

*Primary Examiner* — Beemnet Dada
(74) *Attorney, Agent, or Firm* — Sughrue Mion, PLLC

(57) ABSTRACT

It is determined whether or not a subject operating an information terminal is a human without requiring a character input. A client device displays an authentication screen, sequentially acquires positional information on the authentication screen based on operation information which has been received, records a path which is indicated by the sequentially acquired positional information, and transmits the recorded path to an authentication server. The authentication server determines whether or not an operation indicated by the operation information is an operation performed by a human based on a fluctuation amount of the recorded path with respect to a path as a reference which is defined on the authentication screen.

16 Claims, 8 Drawing Sheets

(56) References Cited

U.S. PATENT DOCUMENTS

2010/0037319 A1\* 2/2010 Steeves et al. .................. 726/23
2010/0225443 A1\* 9/2010 Bayram et al. ............... 340/5.83
2010/0328074 A1\* 12/2010 Johnson et al. ............ 340/573.1
2013/0061216 A1\* 3/2013 Adler et al. ................... 717/173

OTHER PUBLICATIONS

International Search Report for PCT/JP2010/073624 dated Feb. 8, 2011.
European Search Report dated Nov. 7, 2013 corresponding to European Application No. 10857895.6.

\* cited by examiner

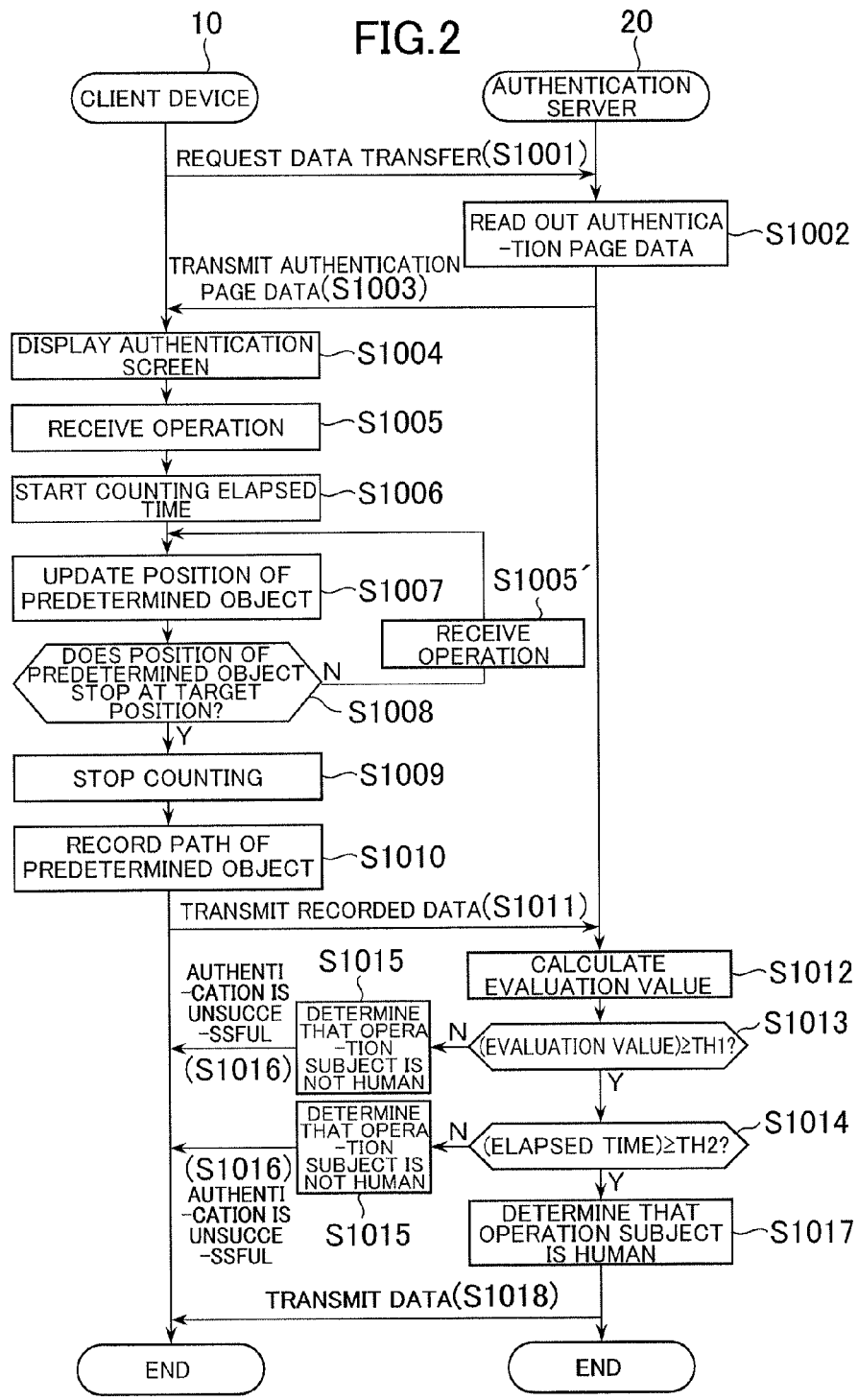

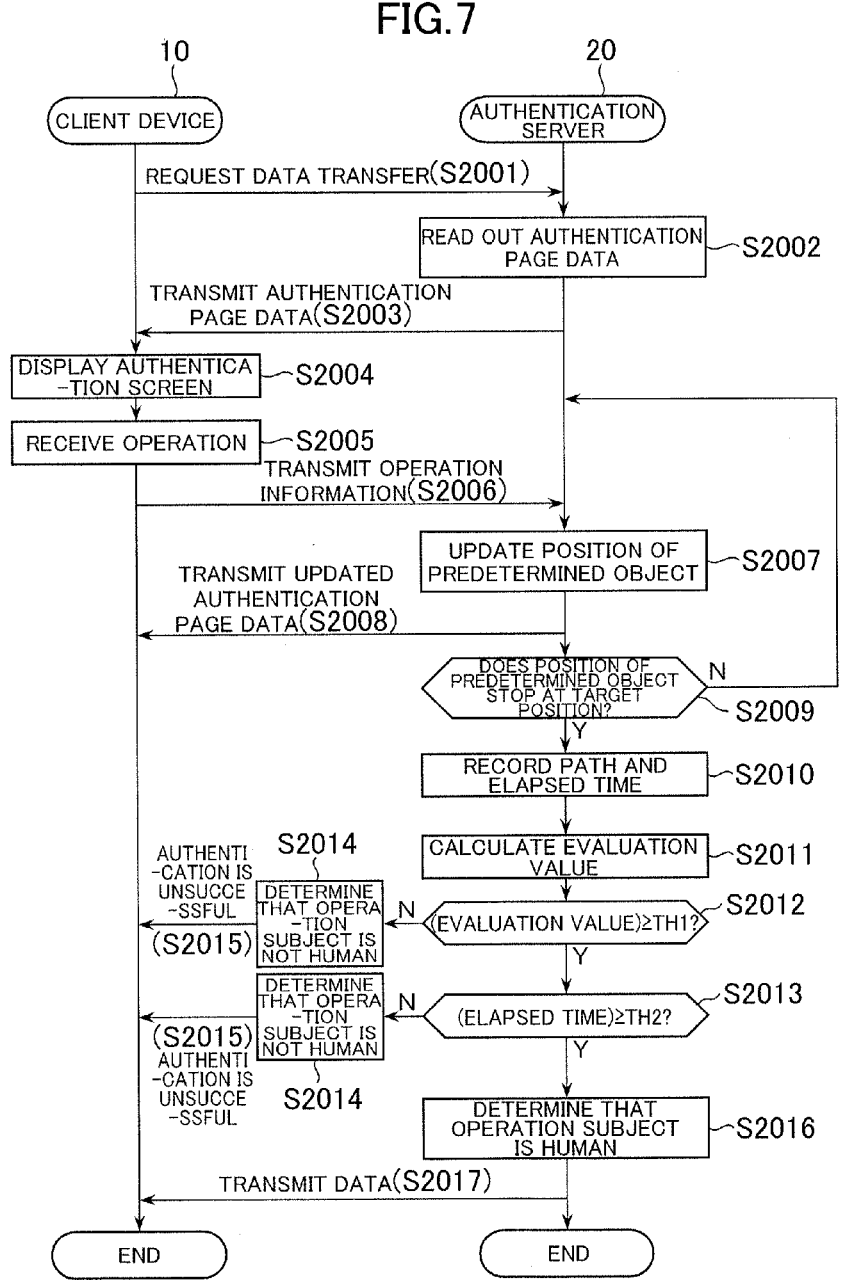

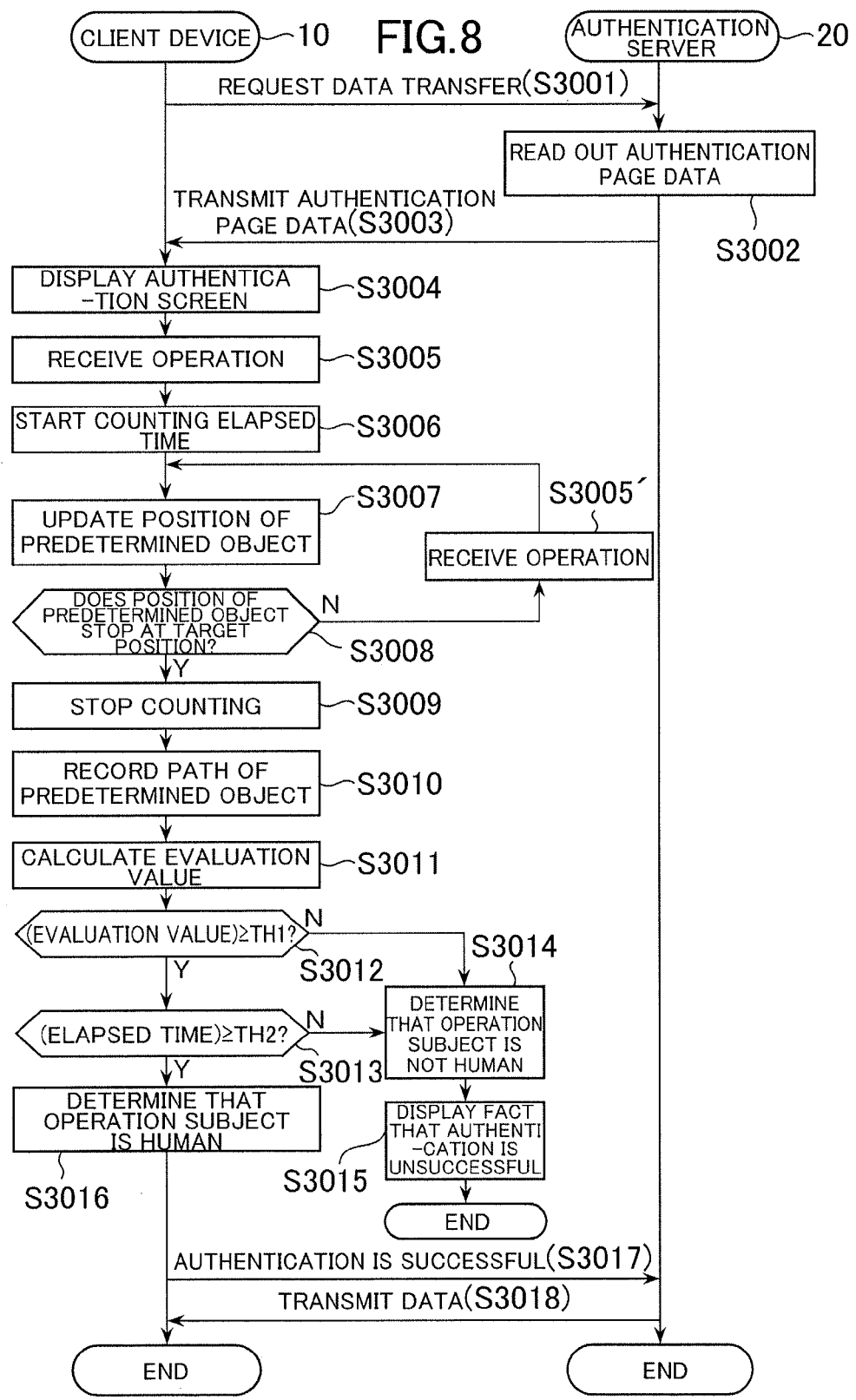

AUTHENTICATION SYSTEM, AUTHENTICATION METHOD, AUTHENTICATION DEVICE, INFORMATION TERMINAL, PROGRAM AND INFORMATION RECORDING MEDIUM

CROSS REFERENCE TO RELATED APPLICATIONS

This application is a National Stage of International Application No. PCT/JP2010/073624 filed Dec. 27, 2010, claiming priority based on Japanese Patent Application No. 2010-216437 filed Sep. 28, 2010, the contents of all of which are incorporated herein by reference in their entirety.

TECHNICAL FIELD

The present invention relates to an authentication system, an authentication method, an authentication device, an information terminal, a program, and an information recording medium.

BACKGROUND ART

At a time of posting on a website or acquiring information from a website, in order to prevent a fraudulent use or an attack by automatic processing performed by using a computer, it is sometimes verified on a server side whether or not a subject operating a computer is a human. For example, Patent Literature 1 below discloses a technology for displaying a character string image (CAPTCHA) which is easy for a human to decipher but is difficult for a machine to decipher, and prompting a user to input the displayed character string so as to determine whether or not the subject operating the computer is a human based on whether the input character string is right or wrong.

CITATION LIST

Patent Literature

[Patent Literature 1] JP 2008-052727 A

SUMMARY OF INVENTION

Technical Problem

As an information terminal which accesses the website, there is an increasing number of portable terminals which are not provided with a keyboard, as well as personal computers which are provided with a keyboard, and hence when a character input is required for determining that an operation subject of the information terminal which has made an access is a human, such character input has been sometimes inconvenient for the user.

The present invention has been made in view of the above-mentioned problem, and has an object to provide an authentication system, an authentication method, an authentication device, an information terminal, a program, and an information recording medium which are capable of determining whether or not a subject operating an information terminal is a human without requiring a character input.

Solution to Problem

In order to attain the above-mentioned object, an authentication system according to the present invention includes: means for causing an information terminal as an authentication target to display an authentication screen; positional information acquisition means for sequentially acquiring positional information on the authentication screen based on operation information on the information terminal; recording means for recording a path which is indicated by the positional information sequentially acquired by the positional information acquisition means; and determination means for determining whether or not an operation indicated by the operation information is an operation performed by a human based on a fluctuation amount of the path recorded by the recording means with respect to a path as a reference which is defined on the authentication screen.

In an aspect of the present invention, the determination means determines that the operation indicated by the operation information is the operation performed by a human when a variance value of displacement amounts of the path recorded by the recording means with respect to the path as the reference which is defined on the authentication screen is a threshold value or larger.

In an aspect of the present invention, the recording means records the path which is indicated by the positional information until the positional information acquired by the positional information acquisition means indicates stopping at a target position which is defined on the authentication screen.

In an aspect of the present invention, the authentication system further includes counting means for counting a period of time until the positional information acquired by the positional information acquisition means indicates stopping at the target position, and the determination means determines that the operation indicated by the operation information is not the operation performed by a human when the period of time counted by the counting means is shorter than a predetermined period of time.

In an aspect of the present invention, on the authentication screen, a predetermined object and a target position for the predetermined object are displayed, the positional information is positional information for indicating the predetermined object on the authentication screen, and the positional information acquisition means sequentially updates and acquires a position of the predetermined object on the authentication screen based on acceleration data which is sequentially detected by an acceleration sensor which is provided to the information terminal.

In an aspect of the present invention, on the authentication screen, an orientation indicator object for indicating a predetermined orientation and a target position for the orientation indicator object are displayed, the positional information is positional information for indicating the orientation indicator object on the authentication screen, and the positional information acquisition means sequentially acquires the positional information on the orientation indicator object on the authentication screen based on orientation data which is sequentially detected by an orientation detection sensor which is provided to the information terminal.

In an aspect of the present invention, the positional information is a specified position for specifying part of the authentication screen, and the positional information acquisition means sequentially acquires the specified position on the authentication screen based on a touched position on display means for displaying the authentication screen, the touched position being sequentially detected by touched position detection means, which is provided to the information terminal, for detecting the touched position.

An authentication method according to the present invention includes: a step of causing an information terminal as an authentication target to display an authentication screen; a positional information acquisition step of sequentially acquiring positional information on the authentication screen based on operation information on the information terminal; a recording step of recording a path which is indicated by the positional information sequentially acquired in the positional information acquisition step; and a determination step of determining whether or not an operation indicated by the operation information is an operation performed by a human based on a fluctuation amount of the path recorded in the recording step with respect to a path as a reference which is defined on the authentication screen.

An authentication device according to the present invention includes: means for causing an information terminal as an authentication target to display an authentication screen; acquisition means for acquiring a path which is indicated by positional information on the authentication screen, the positional information being acquired based on operation information on the information terminal; and determination means for determining whether or not an operation indicated by the operation information is an operation performed by a human based on a fluctuation amount of the path acquired by the acquisition means with respect to a path as a reference which is defined on the authentication screen.

A program according to the present invention causes a computer to function as: means for causing an information terminal as an authentication target to display an authentication screen; acquisition means for acquiring a path which is indicated by positional information on the authentication screen, the positional information being acquired based on operation information on the information terminal; and determination means for determining whether or not an operation indicated by the operation information is an operation performed by a human based on a fluctuation amount of the path acquired by the acquisition means with respect to a path as a reference which is defined on the authentication screen.

An information recording medium according to the present invention has recorded thereon a program for causing a computer to function as: means for causing an information terminal as an authentication target to display an authentication screen; acquisition means for acquiring a path which is indicated by positional information on the authentication screen, the positional information being acquired based on operation information on the information terminal; and determination means for determining whether or not an operation indicated by the operation information is an operation performed by a human based on a fluctuation amount of the path acquired by the acquisition means with respect to a path as a reference which is defined on the authentication screen.

An information terminal according to the present invention includes: display means for displaying an authentication screen based on data on the authentication screen which is acquired from an authentication device; positional information acquisition means for sequentially acquiring positional information on the authentication screen based on operation information which has been received; recording means for recording a path which is indicated by the positional information sequentially acquired by the positional information acquisition means; transmission means for transmitting information on the path recorded by the recording means to the authentication device; and determination result acquisition means for acquiring from the authentication device a determination result of determining whether or not an operation indicated by the operation information is an operation performed by a human based on a fluctuation amount of the path recorded by the recording means with respect to a path as a reference which is defined on the authentication screen.

Another program according to the present invention causes a computer to function as: display means for displaying an authentication screen based on data on the authentication screen which is acquired from an authentication device; positional information acquisition means for sequentially acquiring positional information on the authentication screen based on operation information which has been received; recording means for recording a path which is indicated by the positional information sequentially acquired by the positional information acquisition means; transmission means for transmitting information on the path recorded by the recording means to the authentication device; and determination result acquisition means for acquiring from the authentication device a determination result of determining whether or not an operation indicated by the operation information is an operation performed by a human based on a fluctuation amount of the path recorded by the recording means with respect to a path as a reference which is defined on the authentication screen.

Another information recording medium according to the present invention has recorded thereon a program for causing a computer to function as: display means for displaying an authentication screen based on data on the authentication screen which is acquired from an authentication device; positional information acquisition means for sequentially acquiring positional information on the authentication screen based on operation information which has been received; recording means for recording a path which is indicated by the positional information sequentially acquired by the positional information acquisition means; transmission means for transmitting information on the path recorded by the recording means to the authentication device; and determination result acquisition means for acquiring from the authentication device a determination result of determining whether or not an operation indicated by the operation information is an operation performed by a human based on a fluctuation amount of the path recorded by the recording means with respect to a path as a reference which is defined on the authentication screen.

Advantageous Effects of Invention

According to an aspect of the present invention, it is possible to determine whether or not a subject operating an information terminal is a human without requiring a character input.

BRIEF DESCRIPTION OF DRAWINGS

FIG. 2 A sequence diagram illustrating an example of processing performed in an authentication system according to a first embodiment.

FIG. 7 A sequence diagram illustrating an example of processing performed in an authentication system according to a second embodiment.

FIG. 8 A sequence diagram illustrating an example of processing performed in an authentication system according to a third embodiment.

DESCRIPTION OF EMBODIMENTS

First Embodiment

Referring to the accompanying drawings, description is given below of a first embodiment mode (hereinafter referred to as embodiment) for carrying out the present invention.

Figure 1:
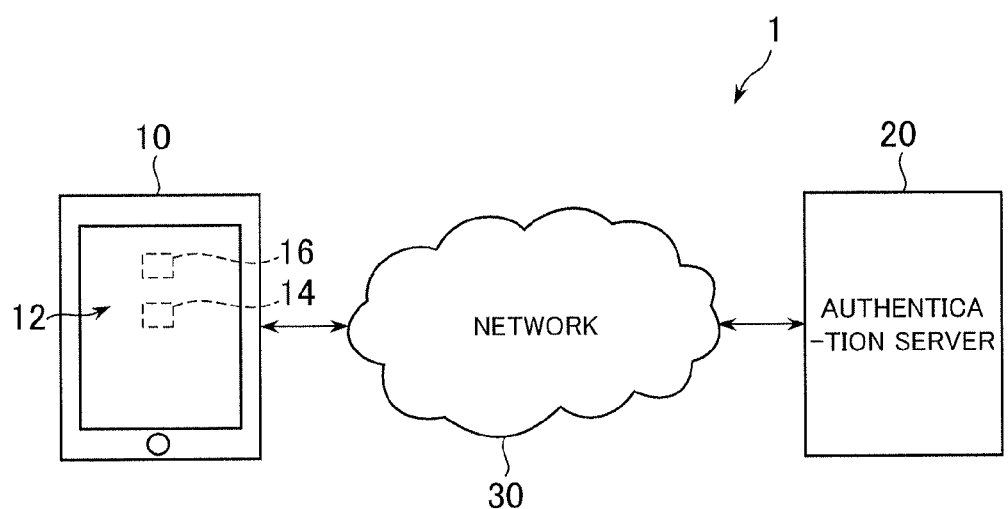
FIG. 1 A system configuration diagram of an authentication system according to embodiments of the present invention.

FIG. 1 illustrates a system configuration diagram of an authentication system 1 according to this embodiment. As illustrated in FIG. 1, the authentication system 1 includes a client device 10 and an authentication server 20, and the client device 10 and the authentication server 20 are communicably connected to one another via a network 30 such as the Internet.

The client device 10 is a computer which is operated by a user. In this embodiment, the client device 10 is a tablet computer including hardware such as a touch panel 12, a three-axis acceleration sensor 14, and a geomagnetic sensor 16 (digital compass), and the client device 10 uses the hardware to detect an operation amount of the user. The client device 10 according to this embodiment further includes a wireless communication interface, and is connected to the network 30 via the wireless communication interface.

The authentication server 20 is a computer for providing data such as a web page including an authentication page to the client device 10, and determining, based on data transmitted from the client device 10 with regard to the provided authentication page, whether or not a subject operating the client device 10 is a human. Note that, as used in this embodiment, the authentication refers to processing of determining whether or not the subject operating the client device 10 is a human. When it is determined that the operation subject is a human, the authentication is successful, and when it is determined that the operation subject is not a human, the authentication is unsuccessful. The authentication server 20 also functions as a web server, and when receiving a request for transmitting data based on a hyperlink or the like from the client device 10, provides the data corresponding to the hyperlink to the client device 10. On that occasion, in a case where the authentication by the client device 10 is required for providing the data, the authentication server 20 transmits the authentication page to the client device 10 before providing the data, and when the authentication performed on the authentication page is successful, provides the data to the client device 10.

Referring to a sequence diagram illustrated in FIG. 2, description is given of an example of processing performed in the authentication system 1 according to this embodiment. In an example of a sequence illustrated in FIG. 2, a browser is activated in the client device 10, and the data is exchanged with the authentication server 20 via the browser.

As illustrated in FIG. 2, the client device 10 first requests the authentication server 20 to transfer the data (S1001). In this case, the authentication is required for transferring the data in response to the request, and the authentication server 20 reads out authentication page data for executing authentication processing (S1002), and then transmits the authentication page data to the client device 10 (S1003). The authentication page data may be HTML data containing a program written in a scripting language processed by the browser, or may be a native program (authentication program) of the client device 10.

The client device 10 displays an authentication screen based on the authentication page data transmitted from the authentication server 20 (S1004).

Figure 3A:
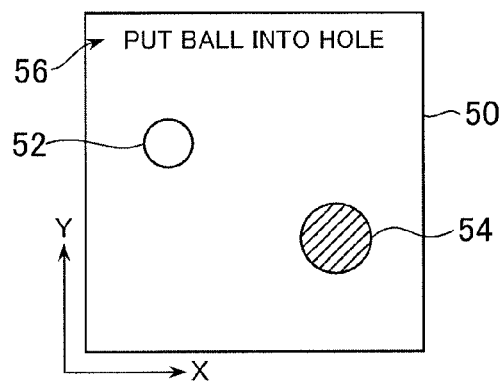
FIG. 3A A diagram illustrating an example of an authentication screen.

FIG. 3A illustrates an example of an authentication screen 50 which is displayed on the client device 10. As illustrated in FIG. 3A, on the authentication screen 50, a ball object 52, a hole object 54, and a text object 56 for displaying a character string ("PUT BALL INTO HOLE") are displayed, and the position of the ball object 52 displayed on the authentication screen 50 moves based on accelerations in an X-axis direction (horizontal direction of the screen) and a Y-axis direction (vertical direction of the screen) (in other words, inclination of the client device 10), which are detected by the acceleration sensor 14 provided to the client device 10.

The client device 10 receives an operation from the user (S1005), starts counting an elapsed time since the start of the operation (S1006), and updates a position of a predetermined object (the ball object 52) based on the received operation (S1007). Then, when the position of the predetermined object (the ball object 52) stops at a target position (position of the hole object 54) (S1008: Y), the client device 10 stops counting the elapsed time (S1009), and then records a path through which the predetermined object (the ball object 52) has moved before the counting is stopped (path taken by the predetermined object) (S1010). Meanwhile, when the position of the predetermined object (the ball object 52) does not stop at the target position (position of the hole object 54) (S1008: N), the client device continues counting the elapsed time, and when receiving the operation from the user during the counting (S1005'), updates the position of the predetermined object (the ball object 52) based on the received operation (S1007), and then executes again the determination in S1008.

The client device 10 transmits recorded data containing the counted elapsed time and the path taken by the predetermined object (the ball object 52) through the operation (operation path) to the authentication server 20 (S1011).

The authentication server 20 calculates an evaluation value based on a fluctuation amount of the operation path with respect to a path as a reference (reference path) which is defined on the authentication page data (S1012). The evaluation value may represent an amount of the fluctuation of the operation path with respect to the reference path, and as the operation path fluctuates more with respect to the reference path (in other words, as the displacement of the operation path with respect to the reference path varies more), the evaluation value becomes larger. For example, a variance of the displacement amounts of the operation path with respect to the reference path may be calculated as the evaluation value. The reference path may be obtained by connecting an initial position of the ball object 52 and the position of the hole object 54 by a predetermined straight line or curved line, or may be an average of the operation paths.

When the above-mentioned calculated evaluation value is smaller than a first threshold value (TH1) (S1013: N), or when the elapsed time transmitted from the client device 10 is smaller than a second threshold value (TH2) (S1014: N), the authentication server 20 determines that the operation subject of the client device 10 is not a human (in other words, processing is performed automatically by a computer program) (S1015), and transmits data indicating that the authentication is unsuccessful (S1016). On the other hand, when the above-mentioned calculated evaluation value is the first threshold value or larger (S1013: Y) and the elapsed time transmitted from the client device 10 is the second threshold value or larger (S1014: Y), the authentication server 20 determines that the operation subject of the client device 10 is a human (S1017), and transmits the data requested by the client device 10 (S1018). The processing described above is the example of the processing performed in the authentication system 1. Note that, in the example of the flow described above, it is determined that the operation subject is a human when both conditions in S1013 and S1014 are satisfied, but it may be determined that the operation subject is a human when any one of the conditions in S1013 and S1014 is satisfied.

Figure 3B:
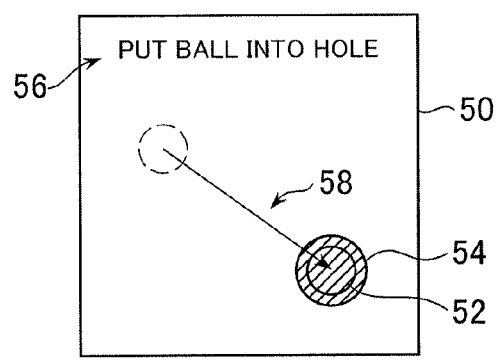
FIG. 3B A diagram illustrating an example of a path of a ball object.
Figure 3C:
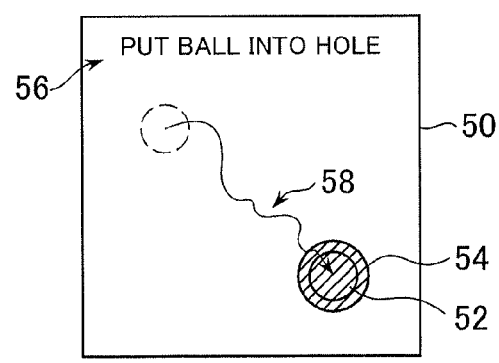
FIG. 3C A diagram illustrating another example of the path of the ball object.

FIG. 3B illustrates an example of a path 58 taken by the ball object 52 in a case where the fluctuation is small, and FIG. 3C illustrates an example of the path 58 taken by the ball object 52 in a case where the fluctuation is large. When a threshold value is set between the evaluation values calculated on the paths 58 respectively illustrated in FIGS. 3B and 3C, in the case of FIG. 3B, it is determined that the operation subject of the client device 10 is not a human, and in the case of FIG. 3C, it is determined that the operation subject of the client device 10 is a human.

It is to be understood that the example of the authentication page data is not limited to that described above, and other examples are described below.

Figure 4A:
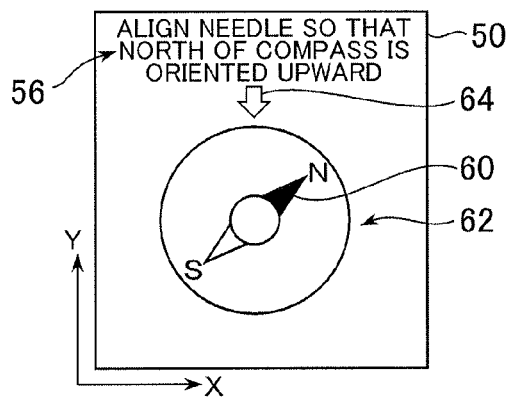
FIG. 4A A diagram illustrating another example of the authentication screen.

FIG. 4A illustrates another example of the authentication screen 50 which is displayed by the authentication page data. FIG. 4A illustrates an initial state of the authentication screen 50, and on the authentication screen 50, a compass object 62 having an orientation indicator object 60 indicating a predetermined orientation as a needle of the compass, a target object 64 to be a target with which the position of the orientation indicator object 60 is to be aligned, and a text object 56 for displaying a character string ("ALIGN NEEDLE SO THAT NORTH OF COMPASS IS ORIENTED UPWARD") are displayed. The position of the orientation indicator object 60 may be updated based on orientation data detected by the geomagnetic sensor 16 provided to the client device 10. The user performs an operation of changing the orientation of the client device 10 until the orientation indicator object 60 indicating a predetermined orientation (for example, north) is aligned with the target object 64 and stops.

Figure 4B:
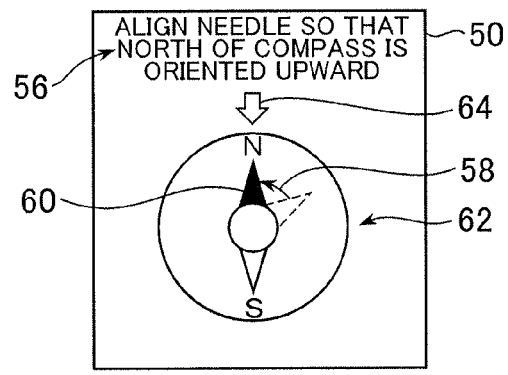
FIG. 4B A diagram illustrating an example of a path of an orientation indicator object.
Figure 4C:
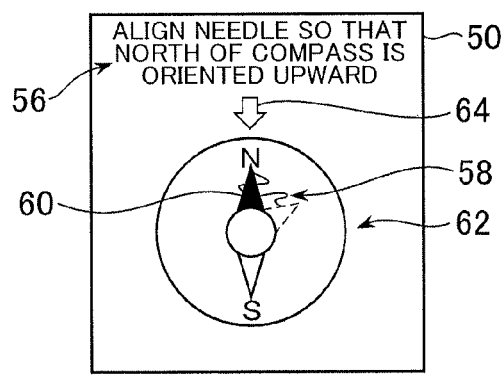
FIG. 4C A diagram illustrating another example of the path of the orientation indicator object.

FIGS. 4B and 4C illustrate examples of the path 58 taken by the orientation indicator object 60. FIG. 4B illustrates an example of the path 58 in a case where the fluctuation is small, and FIG. 4C illustrates an example of the path 58 in a case where the fluctuation is large. When a threshold value is set between the evaluation values calculated on the paths 58 respectively illustrated in FIGS. 4B and 4C, in the case of FIG. 4B, it is determined that the operation subject of the client device 10 is not a human, and in the case of FIG. 4C, it is determined that the operation subject of the client device 10 is a human.

Figure 5A:
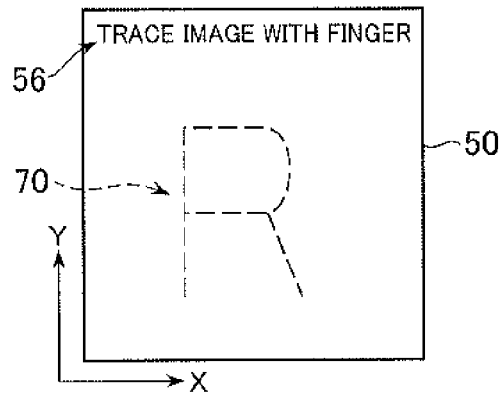
FIG. 5A A diagram illustrating still another example of the authentication screen.

FIG. 5A illustrates still another example of the authentication screen 50 which is displayed by the authentication page data. FIG. 5A illustrates an initial state of the authentication screen 50, and on the authentication screen 50, an image object 70 and a text object 56 for displaying a character string ("TRACE IMAGE WITH FINGER") are displayed. The image object 70 may be constituted of a character, character string, graphic, or the like, or a combination thereof. A drawing object, which is formed as the path 58 of positions through which the image is traced, is updated based on data on a touched position detected by the touch panel 12. The user performs an operation of tracing the image object 70 displayed on the authentication screen 50 with his/her finger until his/her finger reaches an end of the image object 70.

Figure 5B:
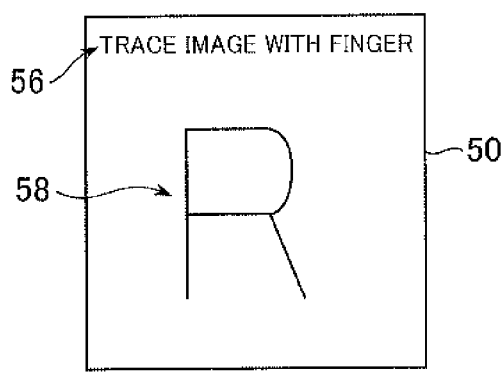
FIG. 5B A diagram illustrating an example of a path of a drawing object.
Figure 5C:
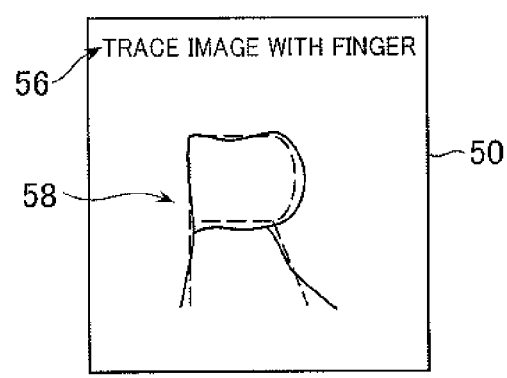
FIG. 5C A diagram illustrating another example of the path of the drawing object.

FIGS. 5B and 5C illustrate examples of the path 58 taken by the drawing object (touched position). FIG. 5B illustrates an example of the path 58 in a case where the fluctuation is small, and FIG. 5C illustrates an example of the path 58 in a case where the fluctuation is large. When a threshold value is set between the evaluation values calculated for FIGS. 5B and 5C, in the case of FIG. 5B, it is determined that the operation subject of the client device 10 is not a human, and in the case of FIG. 5C, it is determined that the operation subject of the client device 10 is a human.

Figure 6:
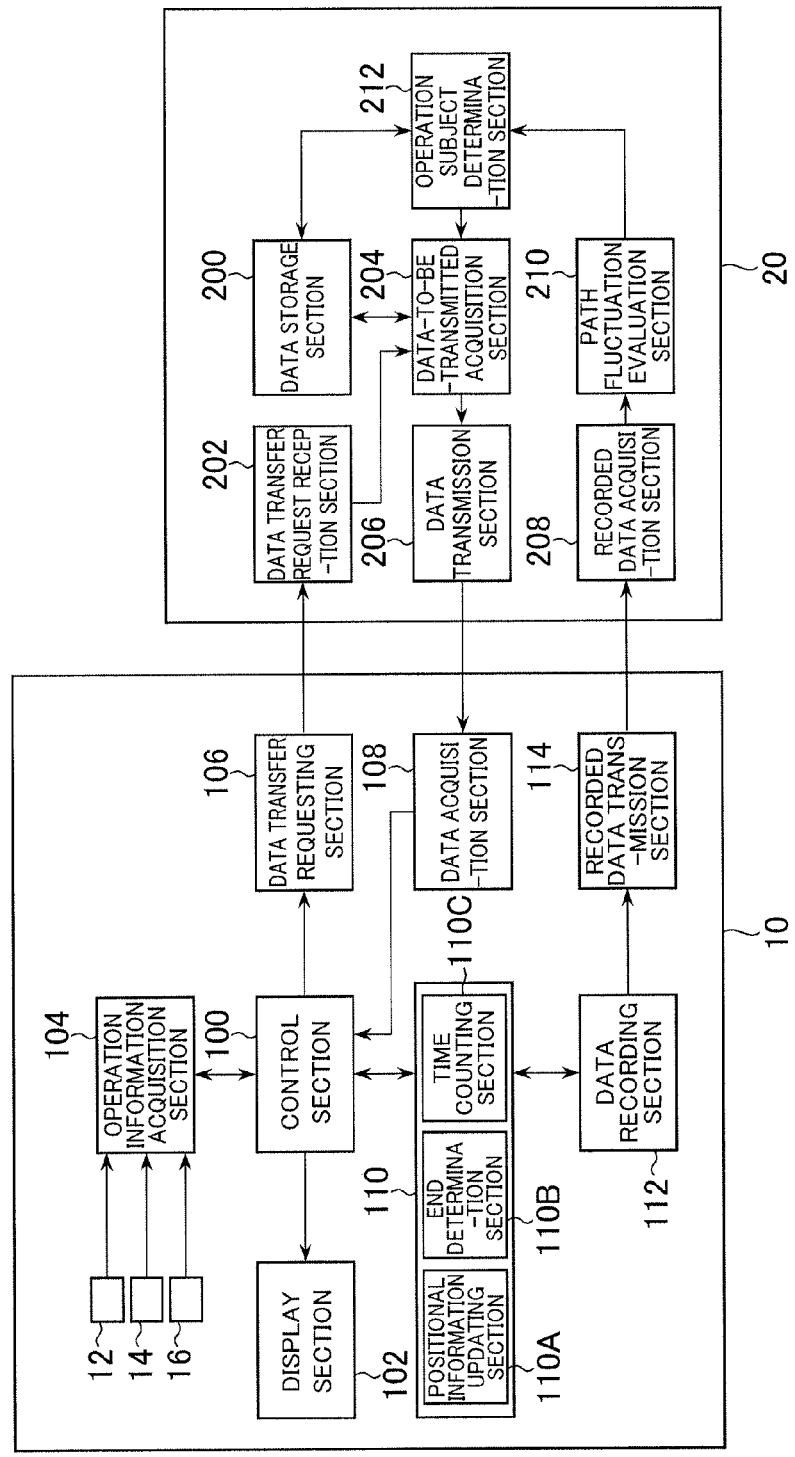
FIG. 6 A functional block diagram of a client device and an authentication server.

Referring to a functional block diagram of the client device 10 and the authentication server 20 illustrated in FIG. 6, detailed description is given of an example of functions provided to each of the devices in order to realize the above-mentioned processing performed in the authentication system 1.

As illustrated in FIG. 6, the client device 10 includes a control section 100, a display section 102, an operation information acquisition section 104, a data transfer requesting section 106, a data acquisition section 108, an authentication page processing section 110, a data recording section 112, and a recorded data transmission section 114.

Functions of the above-mentioned respective sections provided to the client device 10 may be realized by a computer, which includes control means such as a CPU, storage means such as a memory, communication means such as a communication interface, for transmitting/receiving data to/from an external device, and detection means such as the touch panel 12, the acceleration sensor 14, and the geomagnetic sensor 16, reading out and executing a program stored in a computer-readable information storage medium. Note that, the program may be supplied to the client device 10 via an information storage medium such as an optical disc, magnetic disk, magnetic tape, magneto-optical disk, and flash memory, or may be supplied to the client device 10 via a data communication network such as the Internet.

The control section 100 executes data processing in accordance with an operating system (OS), and controls the respective sections of the client device 10. In this embodiment, the data processing executed by the control section 100 includes generation of graphic data to be displayed on the display section 102.

The display section 102 is realized by, for example, the touch panel 12, and displays a screen on the touch panel 12 based on the graphic data generated by the control section 100.

The operation information acquisition section 104 acquires, when the user operates the client device 10, information on the operation (operation information). In this embodiment, the operation information acquisition section 104 acquires inclination data on the inclination of the client device 10 from the three-axis acceleration sensor 14, touched position data on a position touched by the user on the touch panel 12 from a touch sensor, and orientation data indicating an orientation of the predetermined orientation with respect to the client device 10 from the geomagnetic sensor 16. It is to be understood that the operation information is not limited to the above-mentioned example, and for example, in a case where the client device 10 is provided with a button, microphone, and camera, the operation information may include depression information on the button, audio data, and photographed image.

The data transfer requesting section 106 is realized by using, for example, a network interface, and requests transfer of the data based on the operation information received by the operation information acquisition section 104. For example, in a case where a hyperlink is displayed on the display section 102, when the operation information acquisition section 104 acquires the touched position data indicating that part of the hyperlink is touched, the data transfer requesting section 106 may request transfer of page data indicated by the hyperlink.

The data acquisition section 108 is realized by using, for example, a network interface, and in response to a data transfer request made by the data transfer requesting section 106, acquires the data transmitted from the external device. In this embodiment, the data transfer request is transmitted to the authentication server 20 by the data transfer requesting section 106, and in a case where the authentication is required with regard to the data to be transferred in response to the transmission request, the authentication page is transmitted to the client device 10.

The authentication page processing section 110 includes a positional information updating section 110A, an end determination section 110B, and a time counting section 110C, and processes the authentication page acquired by the data acquisition section 108. When the authentication page is acquired, the authentication page processing section 110 first causes the display section 102 to display the authentication page in the initial state. Examples of the authentication page in the initial state displayed in this case are as illustrated in FIGS. 3A, 4A, and 5A.

Under a state in which the authentication page is displayed on the display section 102, the positional information updating section 110A updates positional information on the object displayed on the authentication page based on the operation information sequentially acquired by the operation information acquisition section 104. For example, in the example of the ball dropping illustrated in FIG. 3A, the positional information updating section 110A may sequentially update the position of the ball object 52 based on data on the accelerations in the X direction (horizontal direction of the screen) and the Y direction (vertical direction of the screen) which are sequentially acquired from the acceleration sensor 14. Further, in the example of the digital compass illustrated in FIG. 4A, the positional information updating section 110A may sequentially update the position of the orientation indicator object based on the difference between the orientation of the predetermined orientation and the orientation of the client device 10 which are sequentially acquired from the geomagnetic sensor 16. Still further, in the example of the image tracing illustrated in FIG. 5A, the positional information updating section 110A may sequentially update the positional information on the drawing object drawn by the user based on the touched position data on the touch panel 12 which is sequentially acquired from the touch sensor. Note that, each time the positional information updating section 110A updates the positional information on the object, the control section 100 updates the graphic data on the authentication page and causes the display section 102 to display the updated authentication page.

The end determination section 110B determines whether or not the positional information on the object which is updated by the positional information updating section 110A for the authentication page satisfies an end condition which is defined in advance for the authentication page. For example, when the positional information on the object which is updated by the positional information updating section 110A indicates that the object stops at a predetermined position on the authentication page, the end determination section 110B may end the processing. For example, in the ball dropping illustrated in FIG. 3A, when the speed of the ball object 52 becomes a predetermined value or smaller at the position of the hole object 54, the end determination section 110B may end the processing. Further, in the example of the digital compass illustrated in FIG. 4A, when a changed amount of the position of the orientation indicator object 60 during a predetermined period of time at a position within a predetermined range from the target object 64 becomes a predetermined value or smaller, the end determination section 110B may end the processing. Still further, in the example of the image tracing illustrated in FIG. 5A, when the drawing object drawn by the user reaches the end position of the image object 70, the end determination section 110B may end the processing.

The time counting section 110C counts an elapsed time since the operation information acquisition section 104 acquires the operation information until the end determination section 110B determines to end the processing under the state in which the authentication page is displayed on the display section 102.

The data recording section 112 records the path indicated by the positional information on the predetermined object on the authentication page and the elapsed time counted by the time counting section 110C. Note that, the path indicated by the positional information on the predetermined object on the authentication page may be recorded based on an entirety or part of the positional information on the predetermined object which is sequentially updated by the positional information updating section 110A. In the data on the path, the elapsed time since the start of the operation on the authentication page and the positional information on the predetermined object may be recorded in association with each other.

The recorded data transmission section 114 transmits the data recoded by the data recording section 112 to the authentication server 20. The data recoded by the data recording section 112 may include, in addition to path data and elapsed time data, a session ID assigned to an access made by the client device 10 and identification information on the authentication page.

Next, referring to FIG. 6, description is given of functions provided to the authentication server 20. As illustrated in FIG. 6, the authentication server 20 includes a data storage section 200, a data transfer request reception section 202, a data-to-be-transmitted acquisition section 204, a data transmission section 206, a recorded data acquisition section 208, a path fluctuation evaluation section 210, and an operation subject determination section 212.

Functions of the above-mentioned respective sections provided to the authentication server 20 may be realized by a computer, which includes control means such as a CPU, storage means such as a memory, and communication means such as a communication interface, for transmitting/receiving data to/from the external device, reading out and executing a program stored in a computer-readable information storage medium. Note that, the program may be supplied to the authentication server 20 via an information storage medium such as an optical disc, magnetic disk, magnetic tape, magneto-optical disk, and flash memory, or may be supplied to the authentication server 20 via a data communication network such as the Internet.

The data storage section 200 stores various kinds of data including page data such as the authentication page or web page, reference data on the path relating to the authentication page, and the session ID assigned to the client device 10.

The data transfer request reception section 202 receives the data transfer request from the client device 10. The data transfer request may be represented by, for example, a URL. When receiving an access from the client device 10 for the first time, the data transfer request reception section 202 may generate the session ID, store the session ID in the data storage section 200, and assign the session ID to the client device 10.

The data-to-be-transmitted acquisition section 204 acquires data to be transmitted from the data storage section 200 based on the data transfer request received by the data transfer request reception section 202. For example, in the case where the authentication is required with regard to the data requested by the received data transfer request, the data-to-be-transmitted acquisition section 204 reads out and acquires the authentication page from the data storage section 200. In the data storage section 200, for each authentication page, a model of the client device 10 (for example, information on the OS) and information on the browser which correspond to the each authentication page may be stored in association with each other, and the data-to-be-transmitted acquisition section 204 may acquire a corresponding authentication page from the data storage section 200 based on the model of the client device 10 and the information on the browser.

The data transmission section 206 transmits the data acquired by the data-to-be-transmitted acquisition section 204 to the client device 10 whose data transfer request is received by the data transfer request reception section 202. For example, when the authentication page is acquired by the data-to-be-transmitted acquisition section 204, the data transmission section 206 may transmit the authentication page to the client device 10, associate identification information on the transmitted authentication page with the session ID, and store the identification information in the data storage section 200.

The recorded data acquisition section 208 acquires, for the authentication page transmitted by the data transmission section 206 to the client device 10, the data recorded by the client device 10. For example, the data acquired by the recorded data acquisition section 208 may include the path data, the elapsed time data, the session ID, and the identification information on the authentication page.

The path fluctuation evaluation section 210 evaluates the fluctuation of the path data (operation path) which is acquired by the recorded data acquisition section 208 for the authentication page with respect to the path data (reference path) as a reference which is defined on the authentication page. The path fluctuation evaluation section 210 may calculate, for example, a variance value of the displacement amounts of the operation path with respect to the reference path as the evaluation value of the fluctuation. In this case, as the displacement amount of the operation path with respect to the reference path, a distance between the position of the operation path and the position of the reference path which are obtained every predetermined elapsed time or for every intersection with a straight line that is provided at every predetermined interval (straight line parallel to the X axis or the Y axis) may be used. In that case, the position of the reference path which is obtained every predetermined elapsed time may be defined in advance.

Further, the path fluctuation evaluation section 210 may evaluate the fluctuation of the operation path based on a changing pattern of the operation path, and in this case, the path fluctuation evaluation section 210 may evaluate the fluctuation of the path based on the number of inflection points of the operation path with use of the reference path as a reference and a frequency included in the changing pattern. For example, the fact that the number of inflection points included in the changing pattern of the operation path is larger than a predetermined number or that the changing pattern includes frequency components higher than a predetermined frequency indicates that the path fluctuates (in other words, it is highly possible that the operation path is the path formed by the operation by a human). Note that, information on the frequency components constituting the changing pattern of the path may be obtained by the Fourier transform.

In the above-mentioned examples of the ball dropping, the digital compass, and the image tracing, the paths 58 illustrated in FIGS. 3B, 4B, and 5B, respectively, may be each used as the reference path, but it is to be understood that the reference path is not limited to those examples.

The operation subject determination section 212 determines whether or not the operation subject of the client device 10 is a human based on at least one of an evaluation result obtained by the path fluctuation evaluation section 210 and the elapsed time acquired by the recorded data acquisition section 208. For example, when the evaluation value obtained by the path fluctuation evaluation section 210 is smaller than the first threshold value (in other words, when the fluctuation of the operation path is small), the operation subject determination section 212 determines that the operation performed on the client device 10 is not the operation performed by a human, and determines that the authentication is unsuccessful. Moreover, when the elapsed time acquired by the recorded data acquisition section 208 is smaller than the second threshold value (in other words, when it took only a short time to perform the operation), the operation subject determination section 212 also determines that the operation performed on the client device 10 is not the operation performed by a human, and determines that the authentication is unsuccessful. On the other hand, when the evaluation value obtained by the path fluctuation evaluation section 210 is the first threshold value or larger and at the same time, the elapsed time acquired by the recorded data acquisition section 208 is the second threshold value or larger, the operation subject determination section 212 determines that the operation performed on the client device 10 is the operation performed by a human, and determines that the authentication is successful. It is to be understood that a criterion for the determination is not limited to the example describe above, and when the evaluation value obtained by the path fluctuation evaluation section 210 is the first threshold value or larger or when the elapsed time acquired by the recorded data acquisition section 208 is the second threshold value or larger, the operation subject determination section 212 may determine that the operation performed on the client device 10 is the operation performed by a human, and determine that the authentication is successful.

When the authentication is unsuccessful through the determination by the operation subject determination section 212, the authentication server 20 does not transmit the data requested by the client device 10, and when the authentication is successful, the authentication server 20 transmits the data requested by the client device 10.

According to the authentication system 1 of the first embodiment described above, it is possible to determine whether or not the operation subject of the client device 10 is a human by using the result of the operation of inclining the client device 10, changing the orientation thereof, or touching the screen. In this manner, as compared with the case where the user is prompted to input characters, the time and effort for the user to perform the operation that is required for the authentication can be reduced, and this effect is particularly remarkable in a case where the client device 10 is a tablet computer which is not provided with a keyboard.

Second Embodiment

Next, description is given of a second embodiment of the present invention. The second embodiment is different from the first embodiment in that the client device 10 sequentially transmits the operation information acquired by the operation information acquisition section 104 to the authentication server 20, and updating of the position of the predetermined object and recording of the path and the like on the authentication page are performed on the authentication server 20 side. Description is given below of a flow of processing performed in an authentication system 1 according to the second embodiment.

FIG. 7 illustrates a sequence diagram of the processing performed in the authentication system 1 according to the second embodiment. As illustrated in FIG. 7, the client device 10 requests the authentication server 20 to transfer the data (S2001). In this case, the authentication is required for transferring the data in response to the request, and the authentication server 20 reads out authentication page data for executing authentication processing (S2002), and then transmits the authentication page data to the client device 10 (S2003). The client device 10 displays an authentication screen based on the authentication page data transmitted from the authentication server 20 (S2004).

The client device 10 receives the operation from the user (S2005), and transmits the received operation information to the authentication server 20 (S2006). The authentication server 20 updates the position of the predetermined object based on the transmitted operation information (S2007), and then transmits to the client device 10 the authentication page data in which the position of the predetermined object is updated (S2008). When the updated position of the predetermined object stops at the target position (S2009: Y), the authentication server 20 records the path (operation path) through which the predetermined object has moved before the stop, and the elapsed time that has been required for the movement (S2010).

The authentication server 20 calculates an evaluation value based on a fluctuation amount of the operation path with respect to a path as a reference (reference path) which is defined on the authentication page data (S2011).

When the calculated evaluation value (fluctuation amount) is smaller than a first threshold value (S2012: N), or when the recorded elapsed time is smaller than a second threshold value (S2013: N), the authentication server 20 determines that the operation subject of the client device 10 is not a human (in other words, processing is performed automatically by a computer program) (S2014), and transmits data indicating that the authentication is unsuccessful to the client device 10 (S2015). On the other hand, when the above-mentioned calculated evaluation value (fluctuation amount) is the first threshold value or larger (S2012: Y) and the recorded elapsed time is the second threshold value or larger (S2013: Y), the authentication server 20 determines that the operation subject of the client device 10 is a human (S2016), and transmits the data requested by the client device 10 (S2017). The processing described above is the example of the processing performed in the authentication system 1 according to the second embodiment. Note that, in the example of the flow described above, it is determined that the operation subject is a human when both conditions in S2012 and S2013 are satisfied, but it may be determined that the operation subject is a human when any one of the conditions in S2012 and S2013 is satisfied.

In the authentication system 1 according to the second embodiment, processing on the graphic relating to the authentication page is performed in the authentication server 20, and hence with the processing load on the client device 10 being reduced, it is possible to determine whether or not the subject operating the client device 10 is a human without requiring a character input.

Third Embodiment

Next, description is given of a third embodiment of the present invention. The third embodiment is different from the first embodiment in that the client device 10 executes the authentication processing based on the data recorded by the data recording section 112. Description is given below of a flow of processing performed in an authentication system 1 according to the third embodiment.

FIG. 8 illustrates a sequence diagram of the processing performed in the authentication system 1 according to the third embodiment. As illustrated in FIG. 8, the client device 10 requests the authentication server 20 to transfer the data (S3001). In this case, the authentication is required for transferring the data in response to the request, and the authentication server 20 reads out authentication page data for executing authentication processing (S3002), and then transmits the authentication page data to the client device 10 (S3003). In the authentication page data according to the third embodiment, information on the reference path defined on the authentication page and the threshold values to be used by the operation subject determination section 212 is contained.

The client device 10 displays the authentication screen based on the authentication page data transmitted from the authentication server 20 (S3004). The client device 10 receives an operation from the user (S3005), starts counting an elapsed time (S3006), and updates a position of a predetermined object based on the received operation (S3007). Then, when the position of the predetermined object stops at a target position (S3008: Y), the client device 10 stops counting the elapsed time (S3009), and then records a path through which the predetermined object has moved before the counting is stopped (S3010). Meanwhile, when the position of the predetermined object does not stop at the target position (S3008: N), the client device continues counting the elapsed time, and when receiving the operation from the user during the counting (S3005'), updates the position of the predetermined object based on the received operation (S3007), and then executes again the determination in S3008.

The client device 10 calculates an evaluation value based on a fluctuation amount of the operation path with respect to a path as a reference (reference path) which is defined on the authentication page data (S3011). When the calculated evaluation value (fluctuation amount) is smaller than a first threshold value (S3012: N), or when the recorded elapsed time is smaller than a second threshold value (S3013: N), the client device 10 determines that the operation subject of the client device 10 is not a human (in other words, processing is performed automatically by a computer program) (S3014), and displays a screen showing the fact that the authentication is unsuccessful (S3015). On the other hand, when the above-mentioned calculated evaluation value (fluctuation amount) is the first threshold value or larger (S3012: Y) and the recorded elapsed time is the second threshold value or larger (S3013: Y), the client device 10 determines that the operation subject of the client device 10 is a human (S3016), and notifies the authentication server 20 of the fact that the authentication is successful (S3017). When receiving the notification that the authentication is successful from the client device 10, the authentication server 20 transmits the data requested by the client device 10 to the client device 10 (S3018). The processing described above is the example of the processing performed in the authentication system 1 according to the third embodiment. Note that, in the example of the flow described above, it is determined that the operation subject is a human when both conditions in S3012 and S3013 are satisfied, but it may be determined that the operation subject is a human when any one of the conditions in S3012 and S3013 is satisfied.

In the authentication system 1 according to the third embodiment, the authentication page data (authentication program) is transmitted from the authentication server 20 to the client device 10, and the client device 10 executes the authentication processing based on the transmitted authentication page data, and transmits the result of the authentication processing to the authentication server 20, and hence with the processing load on the authentication server 20 being reduced, it is possible to determine whether or not the subject operating the client device 10 is a human without requiring a character input.

The present invention is not limited to the embodiments described above. For example, as the client device 10, a personal computer which is not provided with the touch panel 12, the acceleration sensor 14, the geomagnetic sensor 16, and the like may be used. In this case, as an input device to be used for moving the position of an object displayed on the authentication page, a mouse or touchpad provided to the personal computer may be used.

The invention claimed is:

1. An authentication system, comprising:
   means for causing a display unit as an authentication target to display an authentication screen; and
   determination means for determining whether or not an operation indicated by the operation information is an operation performed by a human based on a fluctuation amount of an operation path, which is indicated by positional information on the authentication screen sequentially acquired based on operation information with respect to a reference path that is formed by connecting a plurality of positions which are defined in advance on the authentication screen by at least one of a predetermined straight line and a predetermined curved line,
   wherein the fluctuation amount becomes larger as displacement of the operation path with respect to the reference path varies more, and
   the determination means determines that the operation indicated by the operation information is the operation performed by a human when the fluctuation amount of the operation path with respect to the reference path satisfies a predetermined condition.

2. The authentication system according to claim 1, wherein the determination means determines that the operation indicated by the operation information is the operation performed by a human when a variance value of displacement amounts of the operation path with respect to the reference path which is defined on the authentication screen is a threshold value or larger.

3. The authentication system according to claim 1, wherein the operation path is indicated by the positional information until the positional information indicates stopping at a target position which is defined on the authentication screen.

4. The authentication system according to claim 3, further comprising counting means for counting a period of time until the positional information indicates stopping at the target position,
   wherein the determination means determines that the operation indicated by the operation information is not the operation performed by a human when the period of time counted by the counting means is shorter than a predetermined period of time.

5. The authentication system according to claim 3, wherein:
   on the authentication screen, a predetermined object and a target position for the predetermined object are displayed;
   the positional information comprises positional information for indicating the predetermined object on the authentication screen; and
   a position of the predetermined object on the authentication screen is sequentially updated and acquired based on acceleration data which is sequentially detected by an acceleration sensor which is provided to the display unit.

6. The authentication system according to claim 3, wherein:
   on the authentication screen, an orientation indicator object for indicating a predetermined orientation and a target position for the orientation indicator object are displayed;
   the positional information comprises positional information for indicating the orientation indicator object on the authentication screen; and
   the positional information on the orientation indicator object on the authentication screen is sequentially acquired based on orientation data which is sequentially detected by an orientation detection sensor which is provided to the display unit.

7. The authentication system according to claim 3, wherein:
   the positional information comprises a specified position for specifying part of the authentication screen; and
   the specified position on the authentication screen is sequentially acquired based on a touched position on the display unit, the touched position being sequentially detected by touched position detection means, which is provided to the display unit, for detecting the touched position.

8. An authentication method, comprising:
   causing a display unit as an authentication target to display an authentication screen;
   determining whether or not an operation indicated by the operation information is an operation performed by a human based on a fluctuation amount of the an operation path, which is indicated by positional information on the authentication screen sequentially acquired based on operation information with respect to a reference path that is formed by connecting a plurality of positions which are defined in advance on the authentication screen by at least one of a predetermined straight line and a predetermined curved line,
   wherein the fluctuation amount becomes larger as displacement of the operation path with respect to the reference path varies more, and
   the operation indicated by the operation information is determined as the operation performed by a human when the fluctuation amount of the operation path with respect to the reference path satisfies a predetermined condition.

9. The authentication system according to claim 2, wherein the operation path is indicated by the positional information until the positional information indicates stopping at a target position which is defined on the authentication screen.

10. The authentication system according to claim 4, wherein:
   on the authentication screen, a predetermined object and a target position for the predetermined object are displayed;
   the positional information comprises positional information for indicating the predetermined object on the authentication screen; and
   a position of the predetermined object on the authentication screen is sequentially updated and acquired based on acceleration data which is sequentially detected by an acceleration sensor which is provided to the display unit.

11. The authentication system according to claim 4, wherein:
   on the authentication screen, an orientation indicator object for indicating a predetermined orientation and a target position for the orientation indicator object are displayed;
   the positional information comprises positional information for indicating the orientation indicator object on the authentication screen; and
   the positional formation on the orientation indicator object on the authentication screen is sequentially acquired based on orientation data which is sequentially detected by an orientation detection sensor which is provided to the display unit.

12. The authentication system according to claim 4, wherein:
   the positional information comprises a specified position for specifying part of the authentication screen; and
   the specified position on the authentication screen sequentially acquired based on a touched position on the display unit for displaying the authentication screen, the touched position being sequentially detected by touched position detection means, which is provided to the display unit, for detecting the touched position.

13. The authentication system according to claim 1, wherein an information terminal includes the display unit and the fluctuation amount of the operation path is based on movement of the information terminal.

14. The authentication system according to claim 1, wherein the determination means determines that the operation indicated by the operation information is the operation performed by a human when the fluctuation amount of the operation path with respect to the reference path is a threshold value or larger.

15. An authentication system, comprising:
   means for causing a display unit as an authentication target to display an authentication screen;
   counting means for counting a period of time until positional information on the display unit indicates stopping at a target position which is defined on the authentication screen; and
   determination means for determining whether or not an operation indicated by the operation information is an operation performed by a human based on a fluctuation amount of an operation path, which is indicated by positional information on the authentication screen sequentially acquired based on operation information with respect to a reference path that is formed by connecting a plurality of positions which are defined in advance on the authentication screen by at least one of a predetermined straight line and a predetermined curved line,
   wherein the determination means determines that the operation indicated by the operation information is not the operation performed by a human when the period of time counted by the counting means is shorter than a predetermined period of time.

16. An authentication method, comprising:
   causing a display unit as an authentication target to display an authentication screen;
   counting a period of time until positional information on the display unit indicates stopping at a target position which is defined on the authentication screen; and
   determining whether or not an operation indicated by the operation information is an operation performed by a human based on a fluctuation amount of an operation path, which is indicated by positional information on the authentication screen sequentially acquired based on operation information with respect to a reference path that is formed by connecting a plurality of positions which are defined in advance on the authentication screen by at least one of a predetermined straight line and a predetermined curved line,
   wherein the operation indicated by the operation information is determined as the operation not performed by a human when the counted period of time is shorter than a predetermined period of time.

\* \* \* \* \*